United States Patent [19]

Kobayashi

[11] Patent Number: 4,614,438
[45] Date of Patent: Sep. 30, 1986

[54] METHOD OF MIXING FUEL OILS

[75] Inventor: Shozaburo Kobayashi, Takarazuka, Japan

[73] Assignee: Kabushiki Kaisha Kokusai Technicals, Osaka, Japan

[21] Appl. No.: 718,865

[22] Filed: Apr. 2, 1985

[30] Foreign Application Priority Data

Apr. 24, 1984 [JP] Japan .................................. 59-84886
Jun. 5, 1984 [JP] Japan ................................. 59-115257

[51] Int. Cl.$^4$ ............................................ B01F 15/02
[52] U.S. Cl. .................................. 366/132; 236/12.12; 366/152; 366/160; 366/177; 366/348; 431/12
[58] Field of Search ............... 366/131, 132, 144, 145, 366/150-152, 160, 161, 162, 177, 348, 349; 236/12.11, 12.12; 431/12

[56] References Cited

U.S. PATENT DOCUMENTS 3,499,632 3/1970 Piros ..................................... 366/161
4,427,298 1/1984 Fahy et al. ....................... 366/160 X Primary Examiner—Timothy F. Simone
Attorney, Agent, or Firm—Koda and Androlia

[57] ABSTRACT

A method of automatically mixing and controlling two fuel oils A and B substantially different in temperature prior to mixing in a desired ratio and a method of automatically mixing and controlling a mixture ratio of the two oils A and B at a specified temperature gradient in time of mixing. The methods make it possible to reduce cost of the devices concerned, protect engines against thermal shock, and automatize mixing and mutual changeover of the two oils A and B.

7 Claims, 7 Drawing Figures

FIG. 1 (a) PRIOR ART

METHOD OF MIXING FUEL OILS

BACKGROUND OF THE INVENTION

1. Field of the Invention

This invention relates to a method of automatically controlling mixing of two kinds of fuel oil at a desired ratio, and more particularly to a fuel oil mixing method of mixing a low grade oil (for example, Heavy Fuel Oil) with a high grade oil (for example, Diesel Oil), between which oils there is a substantial temperature difference prior to mixing, at a desired ratio, and continuously feeding the mixture as mixed fuel to a diesel engine, gas turbine, boiler or the like.

This invention relates also to a method of controlling the mixing speed in performing the above mixing method.

2. Prior Art

Included under the method of mixing the fuel oils of the kind described above for use in marine engines, boilers, etc. are those methods shown in FIGS. 1(a) to 1(c), of which a method (a) includes metering pumps 4, 5 disposed through strainers 3, 3 in the midway of feed passageways 1, 2 for fuel oils A and B (check valves are indicated by the numeral 10), a method (b) is designed to control two oils A and B at a specified ratio by disposing rate of flow transmitters 6, 7 in the passageways 1, 2 and inputting pulses from the transmitters 6, 7 into an automatic controller 8 to control a flow control valve 9 disposed in one passageway 1 by output from the controller 8 to control two oils A and B at a specified ratio of mixing (the numeral 3 designates strainers and 10 designates check valves), and a method (c) is intended to mix the oils by variable speed pumps 12, 12 being driven by variable speed motors 11, 11.

By the way, on account of the recent inclination of the use of fuel toward low grade oil by reduction in fuel cost and on account of restrictions on conditions of injecting of the highly refined fuel, the supply temperature of the low grade oil is needed to increase and is heated to 120°-140° C., while on the other hand, high grade oil has low viscosity and much volatile matter, so that it is stored at room temperature of 25° to 40° C. to be fed to engines. Accordingly, from the viewpoint of operational control of the engine, high grade fuel oil is used in time of starting the engine, and is changed over to low grade fuel oil at a suitable time after warm-up to enter into continuous operation and is again changed over to high grade oil before stopping the engine. The changeover operation described above has provided a hindrance to automatic operation of the engine in that it demands the use of experience and knack on the part of the operator because there is a great difference in temperature between the two oils and sudden changeover between the oils tends to cause thermal shock.

SUMMARY OF THE INVENTION

In the light of the fact that there is generally a difference in temperature between the two kinds of oils A and B before the oils are mixed, the invention has for its object the provision of a method of mixing fuel oils (hereinafter referred to as "first method") and a method of controlling the mixing ratio changing speed (hereinafter please referred to as "mixing speed") the oils (referred to as "a second method") by automatically mixing and controlling the oils so that two oils may obtain a desired mixture ratio by the use of temperature difference between the two oils.

A detailed description will now be given of the two methods with reference to the accompanying drawings.

BRIEF DESCRIPTION OF THE DRAWINGS

FIGS. 1(a), 1(b) and 1(c) explain conventional methods of mixing fuel oils, respectively;

DESCRIPTION OF THE INVENTION

Figure 1B:
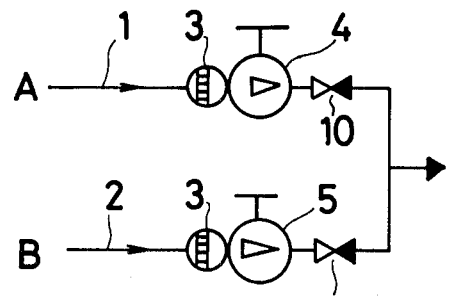
Figure 1B:
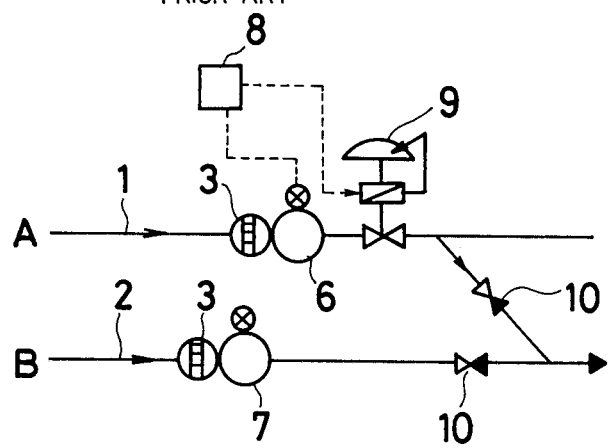
Figure 1C:
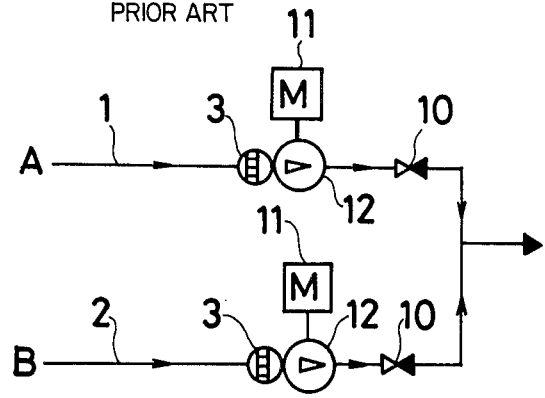

The first method is a mixing method of automatically mixing and controlling two oils in a desired ratio, the fuel oils being substantially different in oil temperature prior to mixing, the method comprising: calculating $T_M$ which satisfies the following equation (1)

$$\frac{M_A}{M_B} = \frac{T_B - T_M}{T_M - T_A} \quad (1)$$

wherein $T_A$ and $T_B$ represent the measured temperatures of fuel oils A and B, respectively; $M_A$ and $M_B$ represent desired mixture ratios (percentage) between the two oils which are set points for control of the two oils A and B; and $T_M$ represents a theoretical oil temperature of the mixed oil at a mixture ratio of $M_A:M_B$, and adapting the result of the calculation for use as reference input to thereby achieve automatic mixing and control of the fuel oils A and B in the desired ratios of $M_A$ and $M_B$ which are set points for control of the oils under feeding back the measured temperature $T_M'$ of the mixed oil as compensation input. Low grade oil B (for example, Heavy Fuel Oil), because its viscosity is as high as 180 to 350 cSt at a temperature of 50° C., is normally heated to a temperature of 70° to 85° C. in a service tank, while on the other hand, high grade oil A (for example, Diesel Oil) is generally supplied to an engine by being held at a room temperature of 20° to 45° C. in the tank to secure the safety of operation partly in consideration of its low viscosity and volatility. Accordingly, there is a temperature difference of 25° to 65° C. between the upper and lower limits of the two. The relation between the temperature difference and mixture ratio (percentage) is explained with reference to FIG. 2. In the figure, the mixture ratios (percentage) of A-oil and B-oil are plotted as X-axis vs. the fuel oil temperature as Y-axis. The A-oil is cited as an example of a high grade oil and the B-oil as an example of a low grade oil. If the temperature of A-oil before mixing is represented as $T_A$, the temperature of B-oil before mixing as $T_B$, the temperatures of mixed oils A and B brought into desired mixture ratios $M_A$ and $M_B$ are represented as $T_M$, a point of intersection at which a horizontal line including $T_A$ crosses a vertical line Y' is represented as $t_A$, a point of intersection at which a horizontal line including $T_M$ crosses a vertical line Y' is represented as $t_M$, and a point of intersection at which a vertical line including $T_M$ crosses a horizontal line including the $T_A$ is represented as $t_{AM}$, $\Delta T_B \cdot T_A \cdot t_A$, $\Delta T_B \cdot T_M \cdot t_M$, and $\Delta T_M \cdot T_A \cdot t_{AM}$ have right-angled triangles similar to each other, respectively.

Accordingly, in $\Delta t_B \cdot T_A \cdot t_A$ and $\Delta T_B \cdot T_M \cdot t_M$, $$\frac{T_B - T_A}{M_B + M_A} = \frac{T_B - T_M}{M_A} \therefore M_A = \frac{(M_B + M_A)(T_B - T_M)}{T_B - T_A}$$

and in $\Delta T_B \cdot T_A \cdot t_A$ and $\Delta T_M \cdot T_A \cdot t_{AM}$, $$\frac{T_B - T_A}{M_B + M_A} = \frac{T_M - T_A}{M_B} \therefore M_B = \frac{(M_B + M_A)(T_M - T_A)}{T_B - T_A}$$

Mixture ratio of mixed oils A and B $$\frac{M_A}{M_B} = \frac{\frac{(M_B + M_A)(T_B - T_M)}{T_B - T_A}}{\frac{(M_B + M_A)(T_M - T_A)}{T_B - T_A}} = \frac{T_B - T_M}{T_M - T_A} \quad (1)$$

is obtained.

Figure 2:
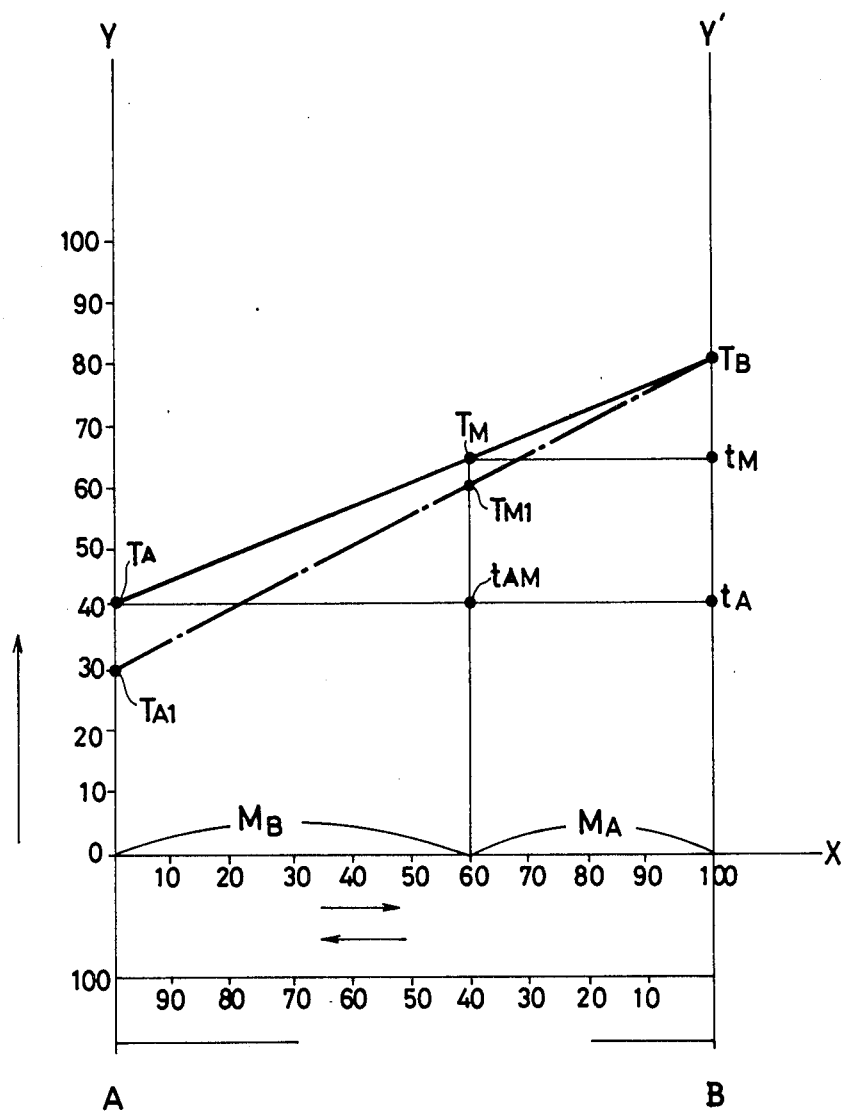
FIG. 2 is a characteristic representation of a temperature mixture ratio of fuel oil constituting the principle of the invention.

Therefore, when automatic control is made of the mixture ratios $M_A$, $M_B$ which are the set points for control, the temperatures $T_A$, $T_B$ of both fuel oils A, B are detected and the temperatures detected are inputted into an operation unit in a ratio controller 9 to make the operation unit calculate $T_M$ which satisfies the equation (1). The result of the calculation is inputted as a reference into a control unit in the ratio controller, and automatic mixing and control of the mixture ratios $M_A$, $M_B$ which are the set points is achieved by feeding the temperature $T_M'$ back to the control unit. In FIG. 2, when the temperature of oil A changes to $T_{A1}$, the temperature of new mixed oil becomes $T_{M1}$, but in this case, it is only necessary to substitute $T_{M1}$ for $T_M$ in the equation (1). In the above operation, $T_M$ which is a reference value for control is found as an equal temperature value according to the following equation (2) expanded from the equation (1)

$$TM = \frac{M_A \cdot T_A + M_B \cdot T_B}{M_A + M_B} \text{ (but } M_A + M_B = 100) \quad (2)$$

Figure 3:
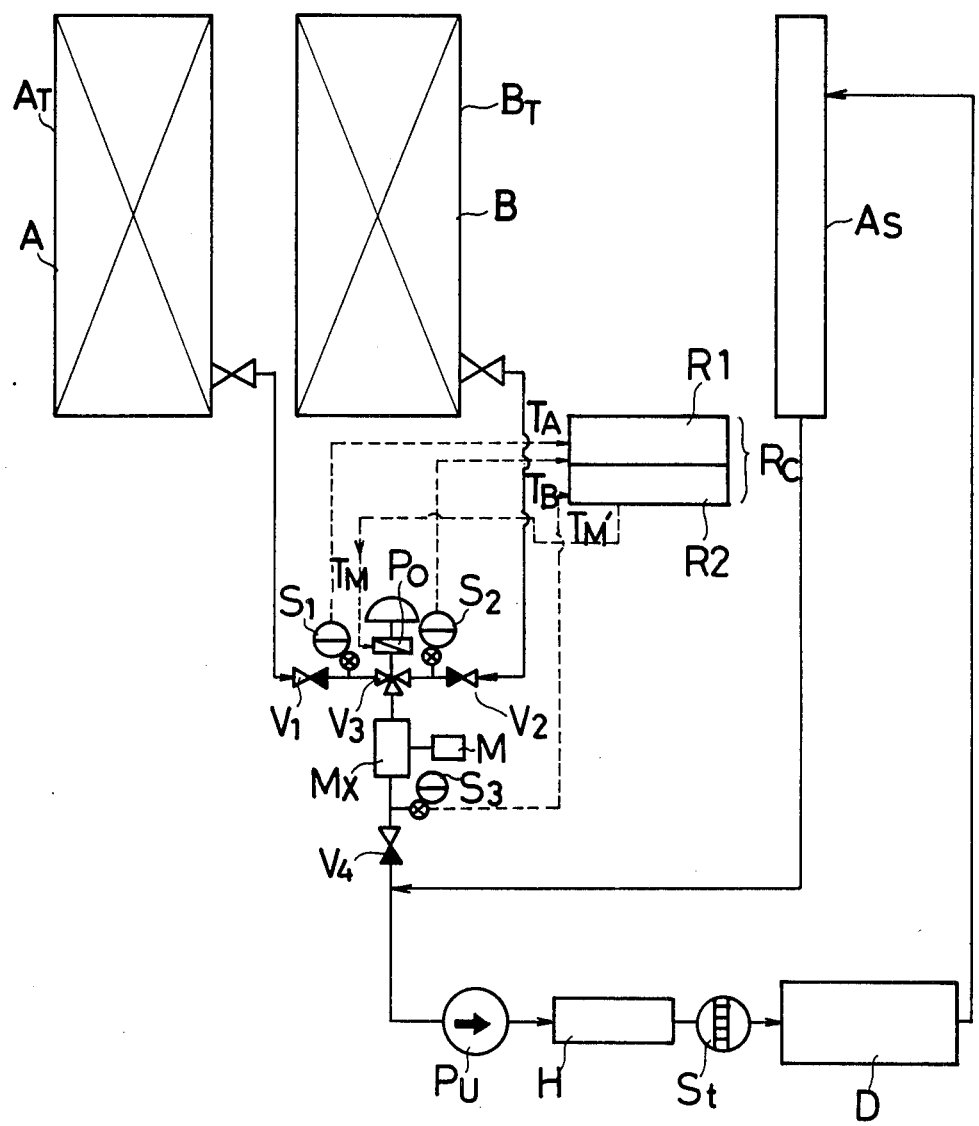
FIG. 3 is a representation explaining an apparatus embodying the first method of the invention.

A description will now be given of a concrete construction for practising an embodiment of the invention according to the above theory with reference to FIG. 3. In FIG. 3, $A_T$, $B_T$ designate oil service tanks for oil A and oil B, respectively. The oil A is kept at a temperature of 20° to 45° C. and the oil B is kept at a temperature of 70° to 85° C. in the respective tanks. The characters $V_1$, $V_2$, $V_4$ designate check valves, respectively; $S_1$, $S_2$ and $S_3$ designate temperature sensors for oils A and B, mixed oils A and B, respectively; $R_C$ a ratio controller (operation unit R1+control unit R2); $P_O$ an electropneumatic positioner; $V_3$ a three-way mixing valve for an operation part; $M_X$ a dynamic mixer for mixed oils A and B; M a motor for the mixer; $P_U$ a booster pump; H a heater; St a strainer; and D designates a diesel engine. Moreover, out of the detected temperature signals of the sensors $S_1$, $S_2$ and $S_3$, signals $T_A$, $T_B$ are inputted into the operation unit R1 in the ratio controller $R_C$ and $T_M'$ is inputted into the control unit R2 in the ratio controller $R_C$. The character $A_S$ designates an air separator.

Since the apparatus is constructed as above, the following equation $$T_M = \frac{M_A \cdot T_A + M_B \cdot T_B}{M_A + M_B}$$

is calculated in the operation unit R1 of the ratio controller $R_C$ to calculate the measured temperatures $T_A$ and $T_B$ of the oil A and oil B detected by the sensors $S_1$ and $S_2$, and the result of the calculation is inputted into the control unit R2 as a reference. An output signal from the control unit R2 is inputted into the electropneumatic positioner $P_O$ to control the valve opening of the three-way mixing valve $V_3$ of the operation part. As a result, the mixture ratios $M_A$ and $M_B$ of oil A and oil B are controlled. In this case, the actual oil temperature $T_M'$ of the mixed oils A and B is detected by the temperature sensor $S_3$ to feed back the temperatures $T_M'$ to the control unit R2 of the ratio controller $R_C$. Fed back temperature $T_M'$ drives the control unit to compensate any deviation $(T_M - T_M')$, and make the deviation converge to zero. Thus, the reference input $T_M$ accords to $T_M'$ and achieves control of mixture ratio $M_A$ and $M_B$, which are set points for final control. The mixed oils A and B may be used directly to burn in the engine, but it is desirable for uniformizing the mixing and temperature of the oils so that they may be passed through the dynamic mixer $M_X$ as shown. The mixed oils A and B heated by the heater H are continuously fed via the booster pump $P_U$ to a diesel engine. An embodiment of the first method will be described below.

EXAMPLE 1

In the apparatus shown in FIG. 3, supposing that oil A is Diesel Oil and oil B is Heavy Fuel Oil, $T_A$ is 40° C., $T_B$ is 80° C., $M_A$ is 40%, and $M_B$ is 60%, the following equation (2)

$$TM = \frac{M_A \cdot T_A + M_B \cdot T_B}{M_A + M_B} =$$

$$\frac{(40 \times 40) + (60 \times 80)}{100} = 64° \text{ (C.)}$$

is calculated in the operation unit R1 in the ratio controller $R_C$, and a theoretical oil temperature $T_M$ of 64° C. is inputted into the control unit R2 as a reference signal. An electropneumatic positioner $P_O$ is actuated in response to an output signal from the control unit R2 to control the valve opening of the three-way mixing valve $V_3$ of an operation part, so that both oils are mixed in a ratio of 40% of oil A to 60% of oil B. At the same time, the actual mixed oil temperature $T_M'$ is fed back to the control unit R2 in the ratio controller $R_C$ as compensation input to offset any deviation $(T_M - T_M')$ for a temperature of 64° C. to thereby output a final control signal from the unit R2. Thus, continuous mixing in a ratio $M_A/M_B = 40/60$ is achieved. If the temperature $T_A$ of oil A is dropped from 40° C. to 30° C., the following equation $$T_M = \frac{40 \times 30 + 60 \times 80}{100} = 60 \text{ (°C.)}$$

results, and the temperature $T_M$ automatically follows the change in temperature to maintain a set point $M_A/M_B = 40/60$.

Now, a second method is intended not only to control the mixing of oil A and oil B with feed back control in the first method but also to prevent the thermal shock of the engine. More particularly, this method is a method of automatically mixing and controlling two fuel oils in a desired temperature gradient so as to be in a desired ratio changing speed, the oils being substantially different in oil temperature prior to mixing, the method comprising: calculating $T_M$ which satisfies the following equation (1)

$$\frac{M_A}{M_B} = \frac{T_B - T_M}{T_M - T_A} \quad (1)$$

wherein $T_A$ and $T_B$ represent the measured temperatures of fuel oils A and B, respectively; $M_A$ and $M_B$ represent desired mixture ratios (percentage) between the two oils which are set points for control of the two oils A and B; and $T_M$ represents a theoretical oil temperature of the mixed oil at a mixture ratio of $M_A:M_B$, and calculating $\Delta t$ which satisfies the following equation (3)

$$a = \frac{T_M - T_A}{\Delta t} \text{ or } a = \frac{T_M - T_B}{\Delta t} \quad (3)$$

wherein $\Delta t$ represents the time from initiation of mixing till completion of the desired mixture ratios and a represents the desired temperature gradient, and adapting the result of the calculation for use as reference input to thereby achieve automatic mixing and control of the fuel oils A and B in the desired ratio of $M_A$ and $M_B$ which are set points for control of the oils under feeding back the measured temperature $T_M'$ of the mixed oil as compensation input. Low grade oil B (for example, Heavy Fuel Oil), as previously described, is usually kept heated in a temperature of 70° to 85° C. in the storage tank, and when safe operation of the engine is considered, the oil is heated preferably to a temperature of 120° to 140° C. and is supplied to the engine. On the other hand, high grade oil A (for example, Diesel Oil) as previously described, is generally supplied to the engine with the oil kept at a room temperature of 20° to 45° C. Accordingly, when the oil is supplied to the engine, there is a temperature difference in upper and lower temperature limits between the two oils.

In the first method, supposing that the temperature gradient brought about by mixing oils A and B is represented by a and a lapse of time after initiation of mixing is $\Delta t$, and the other conditions remain in the same as in the first method, $T_M$ which satisfies the aforestated equation $$\frac{M_A}{M_B} = \frac{T_B - T_A}{T_M - T_A} \quad (1)$$

is calculated, and $\Delta t$ which satisfies the equation $$a = \frac{T_M - T_A}{\Delta t} \text{ or } a = \frac{T_M - T_B}{\Delta t} \quad (3)$$

is calculated. The result of the calculation is inputted into the control unit R2 of the ratio controller as reference input, the measured temperature $T_M'$ of mixed oil is detected and the detected value $T_M'$ is fed back to the control unit R2 to achieve automatic control of the mixture ratios $M_A$ and $M_B$. When the oil temperature of oil A changes to $T_{A1}$, the theoretical mixed oil temperature becomes an oil temperature $T_{M1}$, but in this case, it is only necessary to substitute $T_{M1}$ for $T_M$ in the equation (1). In the above calculation, $T_M$ which is a reference value for control can be found as an actual temperature value in accordance with the equation (2) expanded from the equation (1).

Similarly, $\Delta t$ which is a reference value for control can be led in accordance with the following equation (4) expanded from the equation (3).

$$\left. \begin{array}{l} \Delta t = \dfrac{T_M - T_A}{a} \text{ (for starting the engine)} \\ \Delta t = \dfrac{T_M - T_B}{a} \text{ (for stopping the engine)} \end{array} \right\} \quad (4)$$

Figure 4:
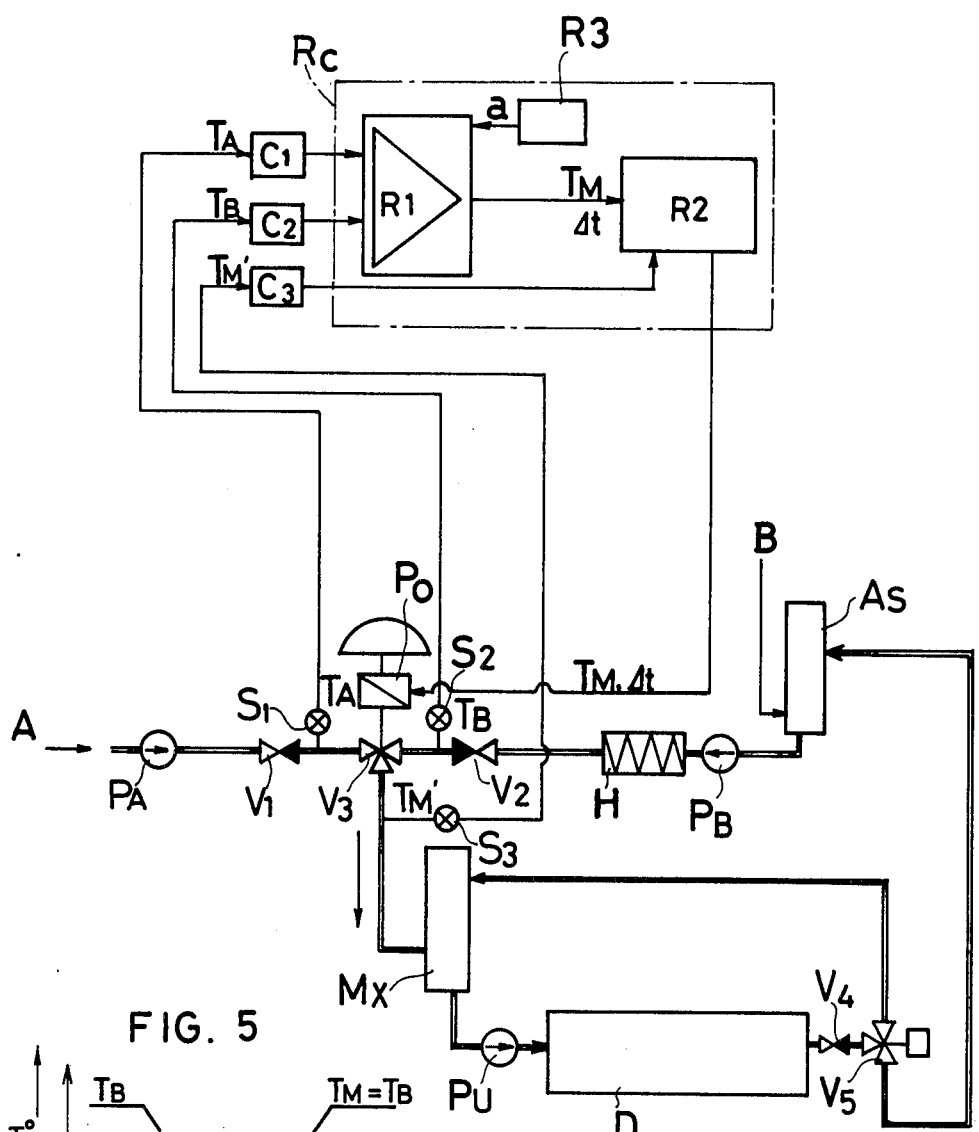
FIG. 4 is a representation explaining an apparatus embodying the second method of the invention.

By the above logical construction, the measured temperatures $T_A$, $T_B$ of oil A and oil B detected by sensors $S_1$ and $S_2$ are calculated in the operation unit R1 of the ratio controller $R_C$ in FIG. 4 by the equation $$T_M = \frac{M_A \cdot T_A + M_B \cdot T_B}{M_A + M_B} \quad (2)$$

and a set point a set in a temperature gradient setter R3 is likewise calculated in the operation unit R1 by the equation $$\Delta t = \frac{T_M - T_A}{a} \text{ or } \Delta t = \frac{T_M - T_B}{a} \quad (4)$$

and thus the result of calculation of $T_M$ and $\Delta t$ are used as a reference input to the control unit R2. An output signal from the control unit R2 is inputted into an electropneumatic positioner $P_O$ to control the valve opening of the three-way mixing valve $V_3$ of the operation part. As a result, the mixture ratios $M_A$ and $M_B$ of oil A and oil B and the temperature gradient a along which the oil A and oil B reach the mixing ratios are controlled. In this case also, the actual oil temperature $T_M'$ of the mixed oil A and oil B are detected by the temperature sensor $S_3$ and fed back to the control unit R2 of the controller $R_C$, so that in the control unit R2, fed back temperature $T_M'$ drives the control unit to compensate any deviation $(T_M-T_M')$, and make the deviation converge to zero. Thus, the reference input $T_M$ accords to $T_M'$ and achieves control of mixture ratio $M_A$ and $M_B$, which are set points for final control.

A description will now be given of an embodiment of the second method.

EXAMPLE 2

Figure 5:
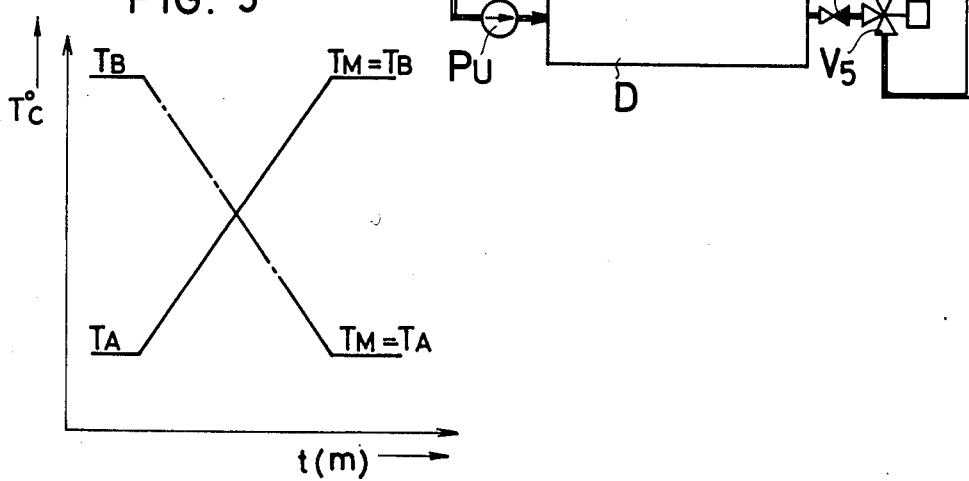
FIG. 5 shows a temperature gradient diagram of mixed oil in the second method.

In the device shown in FIG. 4, the embodiment illustrates the case wherein oil A is Diesel Oil in which $T_A=40°$ C. at a room temperature (within the engine), while oil B is Heavy Fuel Oil which is heated by a heater H to the temperature at which $T_B=120°$ C. and wherein a diesel engine D is driven by the use of oil A, and after warm-up, the use of oil A is changed over to that of oil B to enter into continuous operation. As previously described, the two-oil changeover system is nothing but one form of the mixing method. It means that operation by the use of Diesel Oil in which $M_A=100$ and $M_B=0$ is changed over to operation by the use of Heavy Fuel Oil in which $M_A=0$ and $M_B=100$, in other words, Diesel Oil operation having a temperature of 40° C. is changed over to Heavy Fuel Oil operation having a temperature of 120° C. There is a temperature difference of 80° C. between the two fuel oils, and it is extremely dangerous to make instantaneous changeover of one oil to the other. It is generally believed preferable to avoid a temperature rise above 6° C. for one minute in order to prevent thermal shock of a fuel injection system. When a temperature gradient setter R3 is set to work in such manner as a=5 (°C./min.) in order to suppress a rate of temperature increase within the range of 5° C. per minute, a changeover time Δt calculated by the equation (4) is inputted from the operation unit R1 into the control unit R2 as a set point at the same time as $T_M = T_B$. Namely, within the time represented by $$\Delta t = \frac{120 - 40}{5} = 16 \text{ (minute)},$$

gradual changeover of oils from Diesel Oil to Heavy Fuel Oil is linearly made as shown in FIG. 5. At the outset of changeover, the oil in a mixing chamber $M_X$ is in the mode of Diesel Oil, but it is spent by a diesel engine D and the remaining return oil is fed through a changeover valve $V_5$ back to the mixing chamber $M_X$, wherein the return oil is supplemented with mixed oil from the three-way mixing valve $V_3$ to feed the mixed oil to the engine D. The mixed oil from the three-way valve $V_3$ completes changeover within the time Δt to 100% of Heavy Fuel Oil. At this point of time, the changeover valve $V_5$ is opened to bring the mixing chamber into communication with an air separator $A_S$ and feeds the remaining return oil back to the air separator $A_S$ to thereby complete changeover to continuous operation driven by Heavy Fuel Oil.

Likewise in changeover operation from Heavy Fuel Oil to Diesel Oil before the engine is stopped, conditions $M_A = 100$, $M_B = 0$, and a=5 are set in the ratio controller $R_C$. The changeover valve $V_5$ opened to the air separator $A_S$ in time of starting of changeover is changed over to be brought into communication with the mixing chamber $M_X$ and the return oil is returned to the chamber $M_X$. The oil in the mixing chamber is gradually changed in mixture ratio by the three-way valve $V_3$ from the Heavy Fuel Oil to Diesel Oil with the same temperature gradient held to complete changeover of the Heavy Fuel Oil to the Diesel Oil within a specified period of time Δt.

EXAMPLE 3

This embodiment relates to the case wherein the temperature gradient a in time of changeover of mixing is set in the previous example 1. Supposing that oil A is Diesel Oil and oil B is Heavy Fuel Oil and that $T_A = 40°$ C., $T_B = 80°$ C., $M_A = 40\%$, $M_B = 60\%$, and a=5° C., the following equations (2) and (4)

$$T_M = \frac{M_A \cdot T_A + M_B \cdot T_B}{M_A + M_B} =$$

$$\frac{(40 \times 40) + (60 \times 80)}{100} = 64 \text{ (°C.)}$$

$$\Delta t = \frac{T_M - T_A}{a} = \frac{60 - 40}{5} = 4.8 \text{ (minute)}$$

are calculated in the operation unit R1 of the ratio controller $R_C$ and $T_M$ 60° C. is inputted into the control unit R2 as a reference signal. In response to an output signal from the control unit R2, the electropneumatic positioner $P_O$ is operated to control the opening degree of the three-way mixing valve $V_3$ of the operation part, whereby both oils are mixed in 4.8 minutes in a ratio of 40% of oil A to 60% of oil B. And the actual mixed oil temperature $T_M'$ is fed back to the control unit R2 in the ratio controller $R_C$, and continuous mixing according to the ratio $M_A/M_B = 40/60$ is achieved by controlling the mixed oil at a temperature of 64° C.

As described above, a description has been given of the first method with reference to temperature difference during storage of oils A and B, while a description has been given of the second method with reference to the temperature difference immediately before mixing of oils A and B. Both methods are not incompatible with each other and lie within the same technical range in mixing the fuels substantially different in temperature prior to the mixing.

As will be understood from the description given heretofore, this invention is designed to automatically control a mixture ratio of oil A to oil B by making use of temperature difference between the two oils A and B to dispense with a flow rate transmitter, flow control valve, speed variable pump. All that is necessary is to use a ratio controller, electropneumatic positioner, and ordinary valves, whereby various advantages can be obtained such as reduction in the cost of devices for embodying the invention, simplification of maintenance and inspection of the devices embodied.

Furthermore, this invention is designed to automatically control a mixture ratio of oil A to oil B at a specified temperature gradient, and completely controls and prevents thermal shock even in the case of mixing and making changeover of two fuel oils great in temperature difference. The invention further enables automation of mixing and changeover of fuels and not only relieves the operator of his operation superintendence but also greatly increases safety and reliability necessary for a plant including the whole of the engine.

Accordingly, the invention is widely applicable not only to mixing between low grade oil and high grade oil but also to mixing between two liquid fuels different in temperature.

I claim:

1. A method of automatically mixing and controlling two fuel oils in a desired ratio, said oils being substantially different in oil temperature prior to mixing, said method comprising:

calculating $T_M$ which satisfies the following equation (1)

$$\frac{M_A}{M_B} = \frac{T_B - T_M}{T_M - T_A} \qquad (1)$$

wherein $T_A$ and $T_B$ represent the measured temperatures of fuel oils A and B, respectively; $M_A$ and $M_B$ represent desired mixture ratios (percentage) between the two oils which are set points for control of the two oils A and B; and $T_M$ represents a theoretical oil temperature of the mixed oil at a mixture ratio of $M_A:M_B$, and adapting the result of the calculation for use as reference input to thereby achieve automatic mixing and control of the fuel oils A and B in the desired ratios of $M_A$ and $M_B$ which are set points for control of the oils under feeding back the measured temperature $T_M'$ of the mixed oil as compensation input.

2. A mixing method according to claim 1 wherein the measured temperatures $T_A$ and $T_B$ and said mixture ratios $M_A$ and $M_B$ are inputted into the operation unit of a ratio controller to calculate the reference input $T_M$, the $T_M$ is inputted into the control unit of the ratio controller as a reference input signal and the measured temperature $T_M'$ of the mixed oil is also inputted into the control unit as a compensation input signal, and an output signal from the control unit is inputted into an electropneumatic positioner to control the valve opening of a three-way mixing valve of an operation part.

3. A mixing method according to claim 2 wherein the fuel oil A is Diesel Oil, the fuel oil B is Heavy Fuel Oil, $T_A$ is 20° to 45° C., and $T_B$ is 70° to 85° C.

4. A method of automatically mixing and controlling fuel oils in a desired temperature gradient so as to be in a desired ratio, said oils being substantially different in oil temperature prior to mixing, the method comprising:
calculating $T_M$ which satisfies the following equation (1)

$$\frac{M_A}{M_B} = \frac{T_B - T_M}{T_M - T_A} \quad (1)$$

wherein
$T_A$ and $T_B$ represent the measured temperatures of fuel oils A and B, respectively; $M_A$ and $M_B$ represent desired mixture ratios (percentage) between the two oils which are set points for control of the two oils A and B; and $T_M$ represents a theoretical oil temperature of the mixed oil at a mixture ratio of $M_A:M_B$,
calculating
$\Delta t$ which satisfies the following equation (3)

$$a = \frac{T_M - T_A}{\Delta t} \text{ or } a = \frac{T_M - T_B}{\Delta t} \quad (3)$$

wherein
$\Delta t$ represents the time from initiation of mixing till completion of the desired mixture ratios and a represents the desired temperature gradient,
and adapting the result of the calculation for use as reference input to thereby achieve automatic mixing and control of the fuel oils A and B in the desired ratios of $M_A$ and $M_B$ which are set points for control of the oils under feeding back the measured temperature $T_M'$ of the mixed oil as compensation input.

5. A mixing method according to claim 4 wherein the measured temperature $T_A$ and $T_B$, desired mixture ratios $M_A$ and $M_B$ and desired temperature gradient a are inputted into the operation unit of the ratio controller, $T_M$ and $\Delta t$ are inputted into the control unit of the ratio controller as a reference input signal and the measured temperature $T_M'$ of mixed oil is also inputted into the control unit as a feed back to compensate any deviation ($T_M-T_M'$) and an output signal from the control unit is inputted into an electropneumatic positioner to control the valve opening of the three-way mixing valve of the operation part.

6. A mixing method according to claim 4 or 5 wherein the fuel oil A is Diesel Oil, the fuel oil B is Heavy Fuel Oil, $T_A$ is 20° to 45° C. and $T_B$ is 120° to 140° C.

7. A mixing method according to claim 4 or 5 wherein the temperature gradient a in time of mixing is less than 5° C. per minute.

* * * * *